United States Patent [19]
Johannesen

[11] Patent Number: 5,400,879
[45] Date of Patent: Mar. 28, 1995

[54] DRUM BRAKE WHEEL CYLINDER WITH INTERNAL AUTOMATIC ADJUSTMENT

[75] Inventor: Donald D. Johannesen, South Bend, Ind.

[73] Assignee: AlliedSignal Inc., Morristown, N.J.

[21] Appl. No.: 165,993

[22] Filed: Dec. 13, 1993

[51] Int. Cl.⁶ .......................................... F16D 51/00
[52] U.S. Cl. ................... 188/79.62; 188/196 P
[58] Field of Search ............... 188/79.51, 79.63, 79.62, 188/196 R, 196 P

[56] References Cited

U.S. PATENT DOCUMENTS

| | | | |
|---|---|---|---|
| 860,249 | 7/1907 | Sauvage . | |
| 2,244,084 | 6/1941 | Saenger | 188/79.63 |
| 2,291,662 | 8/1942 | Thibeault | 188/196 P |
| 2,951,560 | 9/1960 | Smellie | 188/73 |
| 3,091,310 | 5/1963 | Smith et al. | 188/196 |
| 3,105,264 | 10/1963 | Truhon | 16/66 |
| 3,502,180 | 3/1970 | Aiki et al. | 188/79.5 |
| 3,580,366 | 5/1971 | Plaat et al. | 188/196 |
| 3,589,479 | 6/1971 | Plaat et al. | 188/196 |
| 3,724,605 | 4/1973 | Naismith et al. | 188/71.8 |
| 4,194,264 | 3/1980 | Stoffregen | 16/52 |
| 4,611,691 | 9/1986 | Gornall | 188/71.8 |
| 4,795,006 | 1/1989 | Green | 188/196 |
| 5,131,115 | 7/1992 | Sarto | 16/82 |

FOREIGN PATENT DOCUMENTS

| | | | |
|---|---|---|---|
| 267694 | 5/1988 | European Pat. Off. . | |
| 2626444 | 12/1977 | Germany | 188/196 P |
| 2657332 | 6/1978 | Germany | 188/196 P |
| 1185858 | 3/1970 | United Kingdom | 188/196 R |
| 1328785 | 9/1973 | United Kingdom | 188/196 P |

Primary Examiner—Robert J. Oberleitner
Assistant Examiner—Kevin D. Rutherford
Attorney, Agent, or Firm—Larry J. Palguta; Leo H. McCormick, Jr.

[57] ABSTRACT

The drum brake wheel cylinder (20) comprises a longitudinal through bore (16) having therein a pair of opposed pistons (22, 24) with each piston (22, 24) engaging a respective web (12, 14) of an adjacent drum brake shoe. A first piston (22) includes a longitudinal opening (32) receiving therein one end (62) of a friction rod (60), and the second piston (24) includes a recess opening (27) receiving therein the second end (64) of the friction rod. A friction latch adjusting lever (50) has a central opening (52) receiving therethrough the friction rod (60) and is located diagonally relative to a longitudinal axis of the friction rod (60). A spring (70) is located about the friction rod (60) with one end biasing the friction latch adjuster lever (50) against a wall (34) of the first piston (22) and the other end of the spring engaging an abutment (27B) in the recess opening (27). The first piston (22) includes a through opening (36) receiving slidably therein an adjuster release pin (40) which extends into a slot opening (56) of the friction latch adjusting lever (50). A running clearance (X) is defined between a head (66) at the second end (64) of the friction rod (60) and the abutment (27B) at the opening recess (27). Hydraulic pressure which displaces the pistons (22, 24) a distance greater than the running clearance (X) causes the friction rod (60) to be displaced relative to the friction latch adjusting lever (50) which effects an adjusted at-rest position of the pistons (22, 24) in accordance with drum brake shoe lining wear.

13 Claims, 1 Drawing Sheet

DRUM BRAKE WHEEL CYLINDER WITH INTERNAL AUTOMATIC ADJUSTMENT

The present invention relates generally to a wheel cylinder of a drum brake, and in particular to a drum brake wheel cylinder having an internal automatic adjuster.

For many years, drum brakes have included an automatic adjuster which adjusts an at-rest position of the drum brake shoes in accordance with brake shoe lining wear. As the drum brake shoe linings wear, the adjuster mechanism operates to maintain the drum brake shoes at a predetermined distance or "running clearance" from the rotating drum. Typically, drum brake adjusters have been located exterior to the hydraulic Wheel cylinder and between a pair of opposed ends of the brake shoes. For certain applications, it is highly desirable that the lining wear adjuster be located within the wheel cylinder which has a very clean environment compared to other portions of the drum brake. Additionally, the automatic adjuster would not be subject to damage during handling or servicing of the drum brake. It is highly desirable that an automatic adjuster located within the hydraulic wheel cylinder be provided for a drum brake which does not effect a parking brake function, or at least within one which does not impose parking loads on the automatic adjuster. It is desirable that the automatic adjuster not only be located internally of the hydraulic wheel cylinder, but be of a simple, inexpensive and highly reliable design.

The present invention provides solutions to the above by providing a wheel cylinder in a drum brake, comprising a wheel cylinder having a longitudinal through bore receiving slidably therein a pair of opposed pistons, each piston engaging a web of an adjacent drum brake shoe, a first of said pistons having a longitudinal opening therein receiving a friction rod and a through opening receiving slidably therein an adjuster release mechanism, the second of said pistons having a recess opening receiving therein a second end of said friction rod, a friction latch adjusting lever located about said friction rod to engage the first piston and located adjacent said adjuster release mechanism, spring means disposed about said friction rod to abut at one end said second piston and abut at the other end the adjusting lever, means for effecting a running clearance disposed within the recess of the second piston so as to define a running clearance with the second end of said friction rod, so that hydraulic pressure received within said longitudinal through bore displaces said pistons away from one another whereby displacement of the second piston beyond said running clearance causes the second piston to displace the friction rod relative to the friction latch adjusting lever which advances along the friction rod to an adjusted position so that an at-rest position of the pistons relative to one another is adjusted in accordance with wear of linings on the brake shoes.

The invention is described in detail below with reference to the drawings which illustrate embodiments in which.

Figure 1:
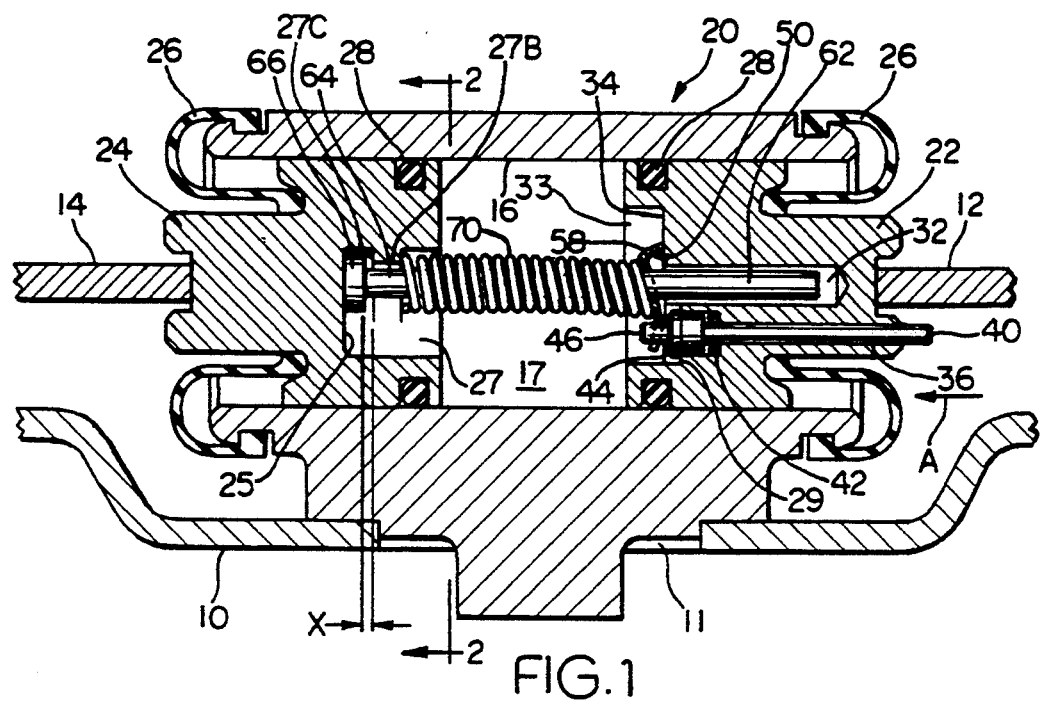
FIG. 1 is a partial section view of the wheel cylinder of the present invention located within a drum brake.
Figure 2:
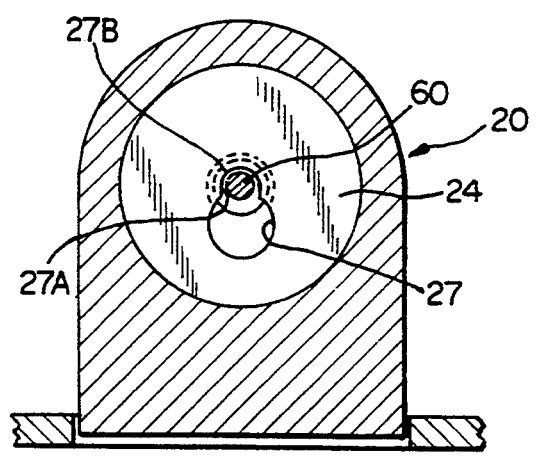
FIG. 2 is an end view of the second piston taken along view line 2—2 of FIG. 1.
Figure 3:
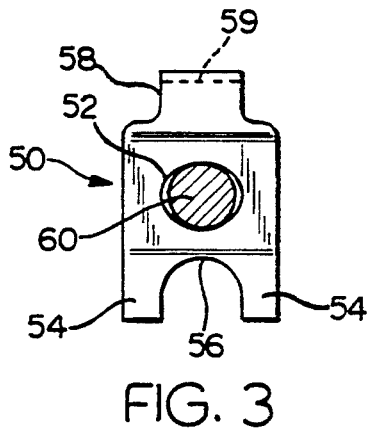
FIG. 3 is an enlarged end view of the friction latch adjusting lever.

FIG. 1 illustrates backing plate 10 of a drum brake which includes opening 11 receiving therein the wheel cylinder of the present invention designated generally by reference numeral 20. Web 12 of a first drum brake shoe and web 14 of a second drum brake shoe are located approximately parallel to the plane of backing plate 10. Wheel cylinder 20 includes longitudinal through bore 16 closed at opposite ends by first piston 22 and second piston 24. Each piston is engaged by a seal 26 which is attached to a respective end of the wheel cylinder, and each piston receives annular seal 28 which engages bore 16 to retain fluid within chamber 17. First piston 22 includes longitudinal opening 32 extending from a recess 33 that includes a wall 34. Stepped through opening 36 receives slidably adjuster release pin 40 having thereabout O-ring 42 which engages sealingly a portion of stepped through opening 36. Adjuster release pin 40 includes enlarged diameter head 44 which abuts piston shoulder 29. End 46 of pin 40 is received within an opening of friction latch-adjusting lever 50 illustrated in FIGS. 1 and 3. Lever 50 includes central opening 52 receiving therethrough friction rod 60, a pair of depending tangs 54 which define slot opening 56 receiving end 46 of pin 40, and an upper laterally extending tang 58 which extends to terminal end 59 that abuts wall 34. Spring 70 engages and biases lever 50 against friction rod 60 and end 59 against wall 34. Depending tangs 54 are spaced apart from and do not engage wall 34. First end 62 of rod 60 is received within longitudinal opening 32 and second end 64 comprises an enlarged head 66 received within recess opening 27 of second piston 24. As illustrated in FIG. 2, recess opening 27 is generally annular shaped and includes narrowed extension 27A which receives friction rod 60 and provides abutment 27B for enlarged head 66. Abutment 27B is abutted on one side by spring 70. As illustrated in FIG. 1, a running clearance or distance X of a predetermined amount is defined between enlarged head 66 and abutment surface 27C of abutment 27B.

Wheel cylinder 20 is illustrated in an at-rest position in FIG. 1. The friction latch adjusting lever is located diagonally relative to the longitudinal axis of friction rod 60 so that it engages and holds friction rod 60 in a fixed position relative to first piston 22 as a result .of the engagement of terminal end 59 with wall 34 of the first piston. Friction rod enlarged head 66 is located the predetermined or running clearance distance X from abutment surface 27C Such that when hydraulic fluid pressure is received within chamber 17 of wheel cylinder 20, the pistons will be displaced away from one another and the running clearance "taken up" or reduced to zero as the adjacent not shown drum brake shoes engage the rotating drum to effect braking thereof. Should the linings of the drum brake shoes have worn to an extent that the drum brake shoes move laterally away from one another greater than the predetermined running clearance distance X, the engagement of second surface 27C with head 66 will displace rod 60 relative to spring 70 biased friction latch adjusting lever 50 which remains in engagement with wall 34. When the braking application has ceased and pistons 22 and 24 return toward each other to an at-rest position, head 66 after moving the predetermined running clearance distance X away from abutment surface 27C will abut recess wall 25 and, as a result of terminal end 59 abutting wall 34 of first piston 22 and engagement of lever 50 with rod 60 to prevent relative movement therebetween, result in the first and second pistons being maintained at an adjusted distance away from one another. The adjusted distance places the pistons slightly further away from one another, while the running clearance distance is maintained at its predetermined amount which keeps the linings of the not shown drum brake shoes a cumulative total of the predetermined running clearance distance away from the rotating drum. When the drum brake is serviced to replace the worn drum brake shoes with new shoes having new linings, adjuster pin 40 is displaced laterally in the direction of Arrow A so that head 44 engages friction latch adjusting lever 50 which is moved toward an approximately perpendicular position relative to friction rod 60. Because central opening 52 has a larger diameter than the diameter of friction rod 60, friction rod 60 will disengage therefrom and slide relative to lever 50 and allow the pistons to advance toward one another so that the new drum brake shoes with new linings can be assembled in the drum brake.

Figure 4:
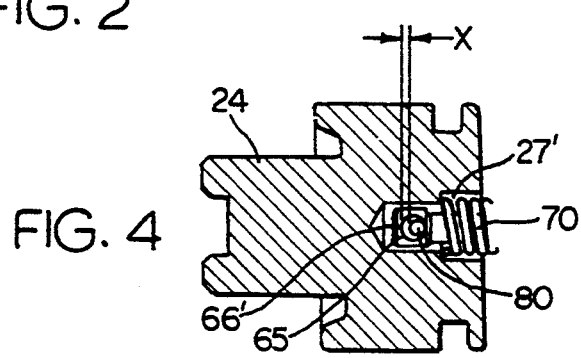
FIG. 4 is a section view of a second embodiment of the second piston of the present invention.

FIG. 4 illustrates an alternative structure for providing the running clearance distance X illustrated in FIG. 1. Rather than providing recess opening 27 which must be machined to the shape illustrated in FIG. 1, a pin 80 can extend into recess opening 27' and through end opening 65 in rod head 66'. End opening 65 has a larger diameter than the diameter of pin 80 so that the running clearance distance X is provided.

The drum brake wheel cylinder with internal automatic adjustment of the present invention can provide a running clearance distance that would be extremely accurate as a function of tolerances as compared to the various screw, ratchet, and lever automatic adjusters currently utilized in drum brakes. While the minimum design running clearance would still have to accommodate the heaviest load situation in order to prevent over adjustment, the maximum design clearance would be closer because of the greater accuracy possible.

I claim:

1. A wheel cylinder in a drum brake, comprising a wheel cylinder having a longitudinal through bore receiving slidably therein a pair of opposed pistons, each piston engaging a web of an adjacent drum brake shoe, a first of said pistons having therein a longitudinal opening receiving a friction rod and a through opening receiving slidably therein an adjuster release mechanism, the second of said pistons having a recess opening receiving therein a second end of said friction rod, a friction latch adjusting lever located about said friction rod to engage the first piston and located adjacent said adjuster release mechanism, the friction latch adjusting lever comprising a generally rectangular member having a central opening receiving therethrough the friction rod, a pair of downwardly extending tangs defining a slotted opening receiving therein the adjuster release mechanism, and an upper laterally extending tang which engages a side wall of said first piston, spring means disposed about said friction rod to abut at one end said second piston and abut at the other end the adjusting lever, means for effecting a running clearance and disposed within the recess of the second piston so as to define a running clearance with the second end of said friction rod, so that hydraulic pressure received within said longitudinal through bore displaces said pistons away from one another whereby displacement of the second piston beyond said running clearance causes the second piston to displace the friction rod relative to the friction latch adjusting lever which advances along the friction rod to an adjusted position so that an at-rest position of the pistons relative to one another is adjusted in accordance with wear of linings on the brake shoes.

2. The wheel cylinder in accordance with claim 1, wherein the recess opening of the second piston comprises a generally annular opening having a narrowed extension extending from one portion thereof in order to capture said second end of the friction rod.

3. The wheel cylinder in accordance with claim 2, wherein the second end of the friction rod comprises an enlarged diameter head which abuts an abutment defined by said narrowed extension of the recess opening after the second piston has been displaced beyond said running clearance.

4. The wheel cylinder in accordance with claim 3, wherein said adjuster release mechanism comprises an adjuster release pin having an end received through the slotted opening within said friction latch adjusting lever, whereby displacement of the adjuster release pin moves the friction latch adjusting lever toward an approximately perpendicular position relative to a longitudinal axis of said friction rod to effect release of the friction rod.

5. The wheel cylinder in accordance with claim 4, wherein the adjuster release pin includes sealing means thereabout.

6. The wheel cylinder in accordance with claim 1, wherein the first piston includes a recess receiving the friction latch adjusting lever and communicating with the through opening.

7. The wheel cylinder in accordance with claim 1, wherein the second piston includes a pin extending transversely within the recess opening and the second end of the friction rod includes an end opening receiving the pill, the end opening having a diameter greater than a diameter of said pin in order to define said running clearance.

8. A wheel cylinder in a drum brake, comprising a wheel cylinder having a longitudinal through bore receiving slidably therein a pair of opposed pistons, each piston engaging a web of an adjacent drum brake shoe, a first of said pistons having therein a longitudinal opening receiving a friction rod and a through opening receiving slidably therein an adjuster release mechanism, the second of said pistons having a recess opening receiving therein a second end of said friction rod, a friction latch adjusting lever located about said friction rod to engage the first piston and located adjacent said adjuster release mechanism, spring means disposed about said friction rod to abut at one end said second piston and abut at the other end the adjusting levers means for effecting a running clearance and disposed within the recess of the second piston so as to define a running clearance with the second end of said friction rod, wherein the running clearance means comprises the second piston including a pin extending transversely within the recess opening and the second end of the friction rod including an end opening receiving the pin, the end opening having a diameter greater than a diameter of said pin in order to define said running clearance, so that hydraulic pressure received within said longitudinal through bore displaces said pistons away from one another whereby displacement of the second piston beyond said running clearance causes the second piston to displace the friction rod relative to the friction latch adjusting lever which advances along the friction rod to an adjusted position so that an at-rest position of the pistons relative to one another is adjusted in accordance with wear of linings on the brake shoes.

9. The wheel cylinder in accordance with claim 8, wherein the recess opening of the second piston comprises a generally annular opening having a narrowed extension extending from one portion thereof in order to capture said second end of the friction rod.

10. The wheel cylinder in accordance with claim 9, wherein the second end of the friction rod comprises an enlarged diameter head which abuts an abutment defined by said narrowed extension of the recess opening after the second piston has been displaced beyond said running clearance.

11. The wheel cylinder in accordance with claim 10, wherein said adjuster release mechanism comprises an adjuster release pin having an end received through an opening within said friction latch adjusting lever, whereby displacement of the adjuster release pin moves the friction latch adjusting lever toward an approximately perpendicular position relative to a longitudinal axis of said friction rod to effect release of the friction rod.

12. The wheel cylinder in accordance with claim 11, wherein the adjuster release pin includes sealing means thereabout.

13. The wheel cylinder in accordance with claim 8, wherein the first piston includes a recess receiving the friction latch adjusting lever and communicating with the through opening.

* * * * *